United States Patent
Shiraishi et al.

(10) Patent No.: US 7,365,112 B2
(45) Date of Patent: Apr. 29, 2008

(54) RUBBER COMPOSITION AND PNEUMATIC TIRE USING THE SAME

(75) Inventors: Fumihiro Shiraishi, Kodaira (JP); Norikazu Otoyama, Kodaira (JP); Daisuke Nohara, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 166 days.

(21) Appl. No.: 10/809,519

(22) Filed: Mar. 26, 2004

(65) Prior Publication Data

US 2004/0198876 A1    Oct. 7, 2004

(30) Foreign Application Priority Data

Mar. 26, 2003 (JP) .............................. 2003-084370
Dec. 10, 2003 (JP) .............................. 2003-411223

(51) Int. Cl.
*C08K 5/15* (2006.01)

(52) U.S. Cl. ..................... 524/110; 524/111; 524/112; 152/525

(58) Field of Classification Search ................ 524/110, 524/111, 112, 376; 152/525
See application file for complete search history.

(56) References Cited

U.S. PATENT DOCUMENTS

| | | | |
|---|---|---|---|
| 4,629,758 A | 12/1986 | Kawaguchi et al. | |
| 5,714,533 A | 2/1998 | Hatakeyama et al. | |
| 6,525,118 B2 * | 2/2003 | Hergenrother et al. | 524/111 |
| 6,598,632 B1 * | 7/2003 | Moreland et al. | 152/151 |

FOREIGN PATENT DOCUMENTS

| | | |
|---|---|---|
| EP | 0 733 673 A1 | 9/1996 |
| JP | 5-194790 A | 8/1993 |

OTHER PUBLICATIONS

G. Eisenbrand et al., "Römpp Lexikon Lebensmittelchemie", Jan. 1, 1995, XP-002284222, "Sorbitane", p. 787.

* cited by examiner

*Primary Examiner*—Peter D. Mulcahy
(74) *Attorney, Agent, or Firm*—Sughrue Mion, PLLC

(57) ABSTRACT

A rubber composition comprises 0.1-10 parts by mass of at least one of non-ionic surfactants having a special structure based on 100 parts by mass of at least one rubber component selected from natural rubber and synthetic diene rubbers.

11 Claims, No Drawings

RUBBER COMPOSITION AND PNEUMATIC TIRE USING THE SAME

BACKGROUND OF THE INVENTION

1. Field of the Invention

This invention relates to a rubber composition and a pneumatic tire using the same, and more particularly to a rubber composition for a sidewall portion capable of good maintaining an appearance of the tire.

2. Description of Related Art

In general, rubber articles using natural rubber or synthetic diene rubber as a starting material generate cracks in their surfaces due to the proceeding of deterioration in the presence of ozone. Such cracks are grown by static and dynamic stresses applied to the rubber article to finally cause the breakage of the rubber article.

In order to suppress the generation and growth of the cracks due to the ozone, a rubber composition containing an amine based antioxidant such as N-(1,3-dimethylbutyl)-N'-phenyl-p-phenylenediamine or the like is applied to the rubber article, particularly a sidewall portion of a tire. Also, such a rubber composition is compounded with a wax in order to form a protection film on the surface of the rubber article for the purpose of static protection from ozone.

However, the amine based antioxidant and wax are effective to suppress the generation and growth of the crack in the presence of ozone, but are liable to be easily moved through a polymer substrate of the rubber component. That is, they are migrated toward the surface of the rubber article, particularly the tire for a short time to cause the discoloration of the rubber article during the keeping in storage or in use to thereby deteriorate an appearance thereof.

On the other hand, there is known a technique that a polyoxyethylene ether type non-ionic surfactant is compounded in a rubber composition for a sidewall portion of the tire to prevent the discoloration through the amine based antioxidant and wax (see JP-A-5-194790).

Lately, it is demanded to make beautiful the appearance by applying a gloss to the rubber article, particularly the tire. In the technique disclosed in the above publication, the blooming is large and a proper gloss can not be maintained though the discoloration can be suppressed.

SUMMARY OF THE INVENTION

It is, therefore, an object of the invention to solve the aforementioned problems of the conventional techniques and to provide a rubber composition hardly discoloring in the presence of ozone and providing a sufficient gloss and a pneumatic tire using such a rubber composition.

The inventors have made various studies in order to achieve the above object and found that when a non-ionic surfactant having a particular structure is compounded with a rubber component to form a rubber composition, the discoloration of this rubber composition can be suppressed in the presence of ozone but also the gloss can be given to the rubber composition and as a result, the invention has been accomplished.

According to the first aspect of the invention, there is the provision of a rubber composition comprising 0.1-10 parts by mass of at least one of non-ionic surfactants represented by the following formulae (I), (II) and (III) based on 100 parts by mass of at least one rubber component selected from natural rubber and synthetic diene rubbers:

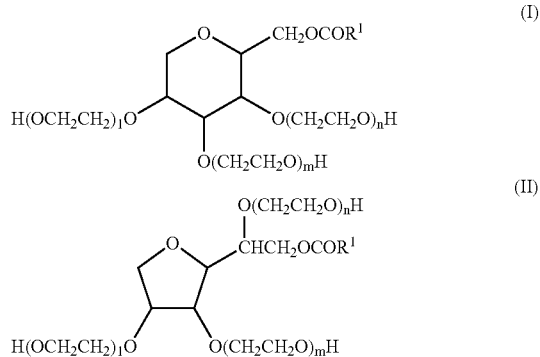

(wherein $R^1$ is an alkyl group or an alkenyl group having a carbon number of 15 to 24, provided that the alkyl group and alkenyl group may be a straight-chain, a branched chain or a cyclic, and each of l, m and n is a numeral of 1 to 10), $$R^2-O(CH_2CH_2O)_pH \quad (III)$$

(wherein $R^2$ is an alkyl group or an alkenyl group having a carbon number of 15 to 24, provided that the alkyl group and alkenyl group may be a straight-chain, a branched chain or a cyclic, and p is a numeral of 1 to 10).

In the rubber composition of the invention, it is preferable that at least one of the non-ionic surfactant represented by the formula (I) and at least one of the non-ionic surfactant represented by the formula (II) are compounded in an amount of 0.1-10 parts by mass in total based on 100 parts by mass of the rubber component.

In a preferable embodiment of the rubber composition according to the invention, a balance value between hydrophilic nature and lipophilic nature (HLB value) in the non-ionic surfactant is 2-19. Particularly, the HLB value in the non-ionic surfactant is preferable to be 8-10.

In another preferable embodiment of the rubber composition according to the invention, each of l, m and n in the non-ionic surfactant represented by the formula (I) is not less than 6. Particularly, each of l, m and n is preferable to be 6. Also, $R^1$ of the formula (I) is preferable to be an alkyl group or an alkenyl group having a carbon number of 18.

In the other preferable embodiment of the rubber composition according to the invention, each of l, m and n in the non-ionic surfactant represented by the formula (II) is not less than 6. Particularly, each of l, m and n is preferable to be 6. Also, $R^1$ of the formula (II) is preferable to be an alkyl group or an alkenyl group having a carbon number of 18.

In a further preferable embodiment of the rubber composition according to the invention, p in the non-ionic surfactant represented by the formula (III) is not less than 4. Particularly, p is preferable to be 4. Also, $R^2$ of the formula (III) is preferable to be an alkyl group or an alkenyl group having a carbon number of 18.

According to the second aspect of the invention, there is the provision of a pneumatic tire characterized by applying the aforementioned rubber composition to a rubber member, preferably a sidewall portion as a rubber member. As a gas filled in the pneumatic tire according to the invention, use may be made of usual air or air having an adjusted oxygen partial pressure but also an inert gas such as nitrogen, argon, helium or the like.

According to the invention, there can be provided a rubber composition hardly discoloring in the presence of ozone and having a good gloss by compounding a non-ionic surfactant of a specified structure into the rubber component in a specified amount as well as a pneumatic tire having a good appearance by using such a rubber composition.

DETAILED DESCRIPTION OF THE INVENTION

The invention will be described in detail below. The rubber composition according to the invention comprises 0.1-10 parts by mass of at least one of non-ionic surfactants represented by the formulae (I), (II) and (III) based on 100 parts by mass of at least one rubber component selected from natural rubber and synthetic diene rubbers. In the rubber composition according to the invention, the non-ionic surfactants represented by the formulas (I), (II) and (III) prevent the discoloration due to the migration of the amine based antioxidant or wax into the surface of rubber, but also the gloss is given by migrating the non-ionic surfactant into the surface under the exposure in the presence of ozone. Therefore, the amount of the non-ionic surfactant(s) compounded in the rubber composition according to the invention is necessary to be 0.1-10 parts by mass based on 100 parts by mass of the rubber component. When the amount is less than 0.1 part by mass, the effect of preventing the discoloration by the amine based antioxidant or wax and the effect of giving the gloss to the surface are less, while when it exceeds 10 parts by mass, the blooming becomes large and the gloss is excessively given or there is caused a problem in the surface tackiness to deteriorate the appearance, and further the scorch time becomes considerably shorter to deteriorate the operability.

As the rubber component used in the rubber composition according to the invention are mentioned natural rubber and synthetic diene rubbers. As the synthetic diene rubber are mentioned isoprene rubber (IR), polybutadiene rubber (BR), styrene-butadiene copolymer rubber (SBR) and the like. These rubber components may be used alone or in a blend of two or more.

The non-ionic surfactants used in the rubber composition according to the invention are represented by the formulae (I), (II) and (III). These non-ionic surfactants may be used alone or in a combination of two or more. Also, commercially available ones may be preferably used. In a preferable embodiment of the rubber composition according to the invention, a mixture of the non-ionic surfactant represented by the formula (I) and the non-ionic surfactant represented by the formula (II) is compounded with the rubber component.

$R^1$ in the formulae (I) and (II) and $R^2$ in the formula (III) are independently am alkyl group or an alkenyl group having a carbon number of 15-24, provided that the alkyl group and alkenyl group may be a straight-chain, a branched chain or a cyclic. When the carbon number is less than 15, the HLB value becomes larger, while when it exceeds 24, the HLB value becomes smaller. As the alkyl group are concretely mentioned octadecyl group and the like. As the alkenyl group are concretely mentioned oleyl group and the like. In these alkyl groups and alkenyl groups, the carbon number is preferable to be 18. As the alkyl group having a carbon number of 18 is mentioned stearyl group or the like, and as the alkenyl group having a carbon number of 18 is mentioned oleyl group or the like. When the carbon number of the alkyl group or alkenyl group is 18, the surfactant can be most stably existent in the polymer substrate and properly migrated into the surface by subjecting to stimulation.

Each of l, m and n in the formulae (I) and (II) and p in the formula (III) is 1-10. When either of l, m and n in the formula (I) is zero, when either of l, m and n in the formula (II) is zero, and when p in the formula (III) is zero, the compatibility with rubber becomes good to hardly migrate the non-ionic surfactant into the surface, while when it exceeds 10, the scorch time of the rubber composition becomes too short and hence the operability is deteriorated.

Each of l, m and n in the formulae (I) and (II) is preferable to be not less than 6 in view of the migration rate into the surface, and it is particularly preferable to be 6 from a viewpoint of obtaining an adequate migration rate. On the other hand, p in the formula (III) is preferable to be not less than 4 in view of the migration rate into the surface, and it is particularly preferable to be 4 from a viewpoint of obtaining an adequate migration rate.

In the non-ionic surfactant(s), the HLB value (balance value between hydrophilic nature and lipophilic nature) is preferable to be 2-19. In the invention, the HLB value is defined by the following Griffin equation:

$$HLB = 20 \times Mw/M$$

(wherein M is a molecular weight of the non-ionic surfactant and Mw is a molecular weight of a hydrophilic portion in the non-ionic surfactant).

When the HLB value of the non-ionic surfactant is less than 2, the lipophilic nature becomes too strong and the compatibility with rubber is very high and the surfactant hardly migrates into the surface, while when it exceeds 19, the hydrophilic nature becomes too strong, the compatibility with rubber is poor and the milling is difficult. Moreover, the HLB value of the non-ionic surfactant is further preferable to be a range of 8-10. In the latter range, the migration rate into the surface becomes fast to make large the improving effect and also the scorch time of the rubber composition becomes optimum to improve the operability.

The rubber composition is preferable to be compounded with an amine based antioxidant and a wax for suppressing the generation and growth of cracks due to ozone. As the amine based antioxidant are mentioned N-(1,3-dimethylbutyl)-N'-phenyl-p-phenylenediamine and the like. Further, the rubber composition may be properly compounded with additives usually used in rubber industry such as a filler, a vulcanizing agent, a vulcanization accelerator, a scorch retarder, a softening agent, zinc oxide, stearic acid, a silane coupling agent and so on within a scope of the invention. As the additive may be preferably used commercially available ones. The rubber composition can be produced by milling, warming up or extruding the rubber component, the non-ionic surfactant(s) and, if necessary, properly selected additives.

The pneumatic tire according to the invention is characterized by applying the above rubber composition to any of rubber members, particularly a sidewall portion of the tire. In such a tire, the discoloration due to the migration of the amine based antioxidant and wax into the surface of the tire is prevented and also the gloss is given by migrating the non-ionic surfactant into the surface through the exposure in the presence of ozone and hence the appearance is maintained at a good level over a long period.

The following examples are given in illustration of the invention and are not intended as limitations thereof.

Various rubber compositions are prepared according to a compounding recipe shown in the following Table 1 and by using a compounding amount of a non-ionic surfactant(s) shown in the following Table 2, and then vulcanized at 150°

C. for 30 minutes. With respect to the resulting vulcanizates, the scorch time and tensile stress are measured by the following methods, and the blacking degree and gloss value are evaluated according to the following standards, and the appearance is evaluated from the blacking degree and gloss value. In Table 2, symbol ○ shows a good appearance, and symbol Δ shows an ordinary appearance, and symbol × shows a poor appearance.

(1) Scorch Time

A time that the Mooney viscosity rises from a minimum viscosity up to 5 units (scorch time) is measured at an initial temperature of 130° C. and represented by an index on the basis that Comparative Example 1 is 100. The larger the index value, the longer the scorch time and the better the operability.

(2) Tensile Stress

As a typical indication of a rubber for a sidewall portion is measured a tensile stress at 300% elongation. Concretely, the tensile stress at 300% elongation is measured according to JIS K6251-1993 using a test piece of Dumbbell type No. 3 and represented by an index on the basis that Comparative Example 1 is 100. The larger the index value, the larger the tensile stress at 300% elongation.

2 is a case that the discoloration is observed over more than half region, and numeral 1 is a case that the discoloration is observed over a full region.

TABLE 1

|  | Compounding amount (part by mass) |
| --- | --- |
| Natural rubber | 50 |
| Polybutadiene rubber *1 | 50 |
| Carbon black *2 | 50 |
| Stearic acid | 1 |
| Zinc white | 3 |
| Aromatic oil *3 | 15 |
| Antioxidant 6C *4 | 3 |
| Wax *5 | 1.5 |
| Vulcanization accelerator *6 | 2 |
| Sulfur | 1.5 |
| Non-ionic surfactant | variable |

*1: "JSR BR01" made by JSR Corporation
*2: N550 carbon, "Asahi #65" made by Asahi Carbon Co. Ltd.
*3: process oil, "Fuccol Aromax 3B", made by Fuji Kosan Co., Ltd.
*4: N-(1,3-dimethylbutyl)-N'-phenyl-p-phenylenediamine, "Nocrac 6C", made by Ohuchi Shinko Kagaku Kogyo Co., Ltd.
*5: microcrystalline wax, "Ozoace-0701", made by Nippon Seiro Co., Ltd.
*6: DM (dibenzothiazyl disulfide, MBTS), "VULKCIT DM/MG", made by Bayer AG

TABLE 2

| | | | Example | | | | | | | | | Comparative Example | | | | | | |
|---|---|---|---|---|---|---|---|---|---|---|---|---|---|---|---|---|---|---|
| | | | 1 | 2 | 3 | 4 | 5 | 6 | 7 | 8 | 9 | 1 | 2 | 3 | 4 | 5 | 6 | 7 |
| Amount of non-ionic surfactant compounded | Compound A | parts by mass | 1 | 3 | 8 | — | — | — | — | — | — | — | — | 11 | — | — | — | — |
| | Compound B | | — | — | — | — | — | — | — | — | — | — | 1 | — | — | — | — | — |
| | Compound C | | — | — | — | 1 | 3 | 8 | — | — | — | — | — | — | 11 | — | — | — |
| | Compound D | | — | — | — | — | — | — | 1 | 3 | 8 | — | — | — | — | 11 | — | — |
| | Compound E | | — | — | — | — | — | — | — | — | — | — | — | — | — | — | 1 | — |
| | Compound F | | — | — | — | — | — | — | — | — | — | — | — | — | — | — | — | 1 |
| Scorch time | | Index | 94 | 86 | 76 | 92 | 89 | 80 | 92 | 85 | 73 | 100 | 58 | 59 | 61 | 55 | 51 | 54 |
| Tensile stress at 300% elongation | | Index | 97 | 98 | 96 | 97 | 95 | 94 | 96 | 97 | 96 | 100 | 95 | 94 | 95 | 92 | 93 | 91 |
| Just after vulcanization | gloss value | — | 1 | 1 | 1 | 1 | 1 | 1 | 1 | 1 | 2 | 1 | 2 | 2 | 2 | 3 | 2 | 2 |
| | blacking degree | — | 3 | 3 | 3 | 3 | 3 | 3 | 3 | 3 | 4 | 3 | 2 | 2 | 2 | 2 | 2 | 2 |
| | appearance | — | Δ | Δ | Δ | Δ | Δ | Δ | Δ | Δ | ○ | Δ | Δ | Δ | Δ | Δ | Δ | Δ |
| After left to stand in the presence of ozone | gloss value | — | 3 | 5 | 5 | 3 | 5 | 5 | 4 | 5 | 5 | 1 | 2 | 2 | 2 | 2 | 2 | 2 |
| | blacking degree | — | 4 | 4 | 5 | 4 | 4 | 5 | 5 | 5 | 5 | 2 | 2 | 2 | 2 | 2 | 2 | 2 |
| | appearance | — | ○ | ○ | ○ | ○ | ○ | ○ | ○ | ○ | ○ | Δ | X | X | X | X | X | X |

(3) Gloss Value

The gloss value of the sample is visually evaluated just after the vulcanization and after being left to stand at 40° C. in the presence of 50 pphm of ozone for 1 week, respectively, in which numeral 5 is a case that the gloss is observed over a full region, numeral 4 is a case that the gloss is observed over a wider region, numeral 3 is a case that the gloss is observed over a half region, numeral 2 is a case that the gloss is observed slightly, and numeral 1 is a case that no gloss is observed.

(4) Blacking Degree

The blacking degree of the sample is visually evaluated just after the vulcanization and after being left to stand at 40° C. in the presence of 50 pphm of ozone for 1 week, respectively, in which numeral 5 is a case that no discoloration is observed, numeral 4 is a case that the discoloration is slightly observed, numeral 3 is a case that the discoloration is observed over not more than a half region, numeral In Table 2, the compound A is a mixture of a compound represented by the formula (I), in which $R^1$ is a straight-chain stearyl group having a carbon number of 18 ($CH_3(CH_2)_{17}$—) and each of l, m and n is 6, and having a HLB value of 9.6 and a compound represented by the formula (II), in which $R^1$ is a straight-chain stearyl group having a carbon number of 18 and each of l, m and n is 6, and having a HLB value of 9.6, which is a trade mark "Leodol TW-S106" made by Kao Corporation, while the compound B is a mixture of a compound represented by the formula (I), in which $R^1$ is a straight-chain stearyl group having a carbon number of 18 and each of l, m and n is 20, and having a HLB value of 14.9 and a compound represented by the formula (II), in which $R^1$ is a straight-chain stearyl group having a carbon number of 18 and each of l, m and n is 20, and having a HLB value of 14.9, which is a trade mark "Leodol TW-S12OV" made by Kao Corporation. Also, the compound C is a compound represented by the formula (III), in which $R^2$ is a straight-chain oleyl group having a carbon number of 18 ($CH_3(C$ $H_2)_7CH=CH(CH_2)_8-$) and p is 4, and having a HLB value of 8.8, which is a trade mark "Emulgen 404" made by Kao Corporation, while the compound D is a compound represented by the formula (III), in which $R^2$ is a straight-chain oleyl group having a carbon number of 18 and p is 8, and having a HLB value of 10.0, which is a trade mark "Emulgen 408" made by Kao Corporation.

On the other hand, the compound E is polyoxyethylene nonylphenyl ether, trade mark "Nissan-Nonion NS208.5" made by Nissan Chemical Industries, Ltd. and has a HLB value of 12.6, while the compound F is polyoxyethylene nonylphenyl ether, trade mark "Nissan-Nonion NS215" made by Nissan Chemical Industries, Ltd. and has a HLB value of 15.0.

As seen from Table 2, the rubber compositions according to the invention show a very good appearance because the gloss value and the blacking degree are increased by migrating the non-ionic surfactant into the surface under the exposure in the presence of ozone. On the other hand, the rubber composition of Comparative Example 2 compounded with the mixture of the non-ionic surfactants represented by the formulae (I) and (II), in which the values of l, m and n are outside the range defined in the invention, is poor in the appearance and very short in the scorch time and considerably deteriorates the operability. Furthermore, the rubber compositions of comparative examples 3-5, in which the compounding amount of the non-ionic surfactant is outside the range defined in the invention, and the rubber compositions of comparative examples 6 and 7 compounded with the conventional polyoxyethylene nonylphenyl ether type non-ionic surfactant deteriorate the appearance due to the excessive blooming and are very short in the scorch time to considerably deteriorate the operability.

What is claimed is:

1. A pneumatic tire comprising a rubber member as a sidewall portion, in which the rubber member is made from a rubber composition comprising 0.1-10 parts by mass of at least one of non-ionic surfactants represented by the following formulae (I) and (II) based on 100 parts by mass of at least one rubber component selected from natural rubber and synthetic diene rubbers:

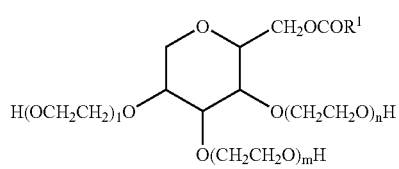

(I)

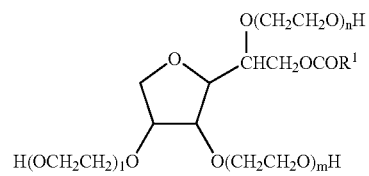

(II)

(wherein $R^1$ is an alkyl group or an alkenyl group having a carbon number of 15 to 24, provided that the alkyl group and alkenyl group may be a straight-chain, a branched chain or a cyclic, and each of l, m and n is a numeral of 1 to 10).

2. A pneumatic tire according to claim 1, wherein at least one of the non-ionic surfactant represented by the formula (I) and at least one of the non-ionic surfactant represented by the formula (II) are compounded in an amount of 0.1-10 parts by mass in total based on 100 parts by mass of the rubber component.

3. A pneumatic tire according to claim 1, wherein a balance value between hydrophilic nature and lipophilic nature (HLB value) in the non-ionic surfactant is 2-19.

4. A pneumatic tire according to claim 1, wherein each of l, m and n in the non-ionic surfactant represented by the formula (I) is not less than 6.

5. A pneumatic tire according to claim 4, wherein each of l, m and n is 6.

6. A pneumatic tire according to claim 1, wherein $R^1$ of the formula (I) is an alkyl group or an alkenyl group having a carbon number of 18.

7. A pneumatic tire according to claim 3, wherein the HLB value of the non-ionic surfactant represented by the formula (I) is 8-10.

8. A pneumatic tire according to claim 1, wherein each of l, m and n in the non-ionic surfactant represented by the formula (II) is not less than 6.

9. A pneumatic tire according to claim 8, wherein each of l, m and n is 6.

10. A pneumatic tire according to claim 1, wherein $R^1$ of the formula (II) is an alkyl group or an alkenyl group having a carbon number of 18.

11. A pneumatic tire according to claim 3, wherein the HLB value of the non-ionic surfactant represented by the formula (II) is 8-10.

* * * * *